(12) United States Patent
Buehlmeyer

(10) Patent No.: US 8,282,068 B2
(45) Date of Patent: Oct. 9, 2012

(54) TOOL AND METHOD FOR MANUFACTURING A TOOL, IN PARTICULAR FOR MANUFACTURING FIBER-REINFORCED COMPONENTS

(75) Inventor: Robert Buehlmeyer, Herzebrock-Clarholz (DE)

(73) Assignee: CLAAS Fertigungstechnik GmbH, Beelen (DE)

( * ) Notice: Subject to any disclaimer, the term of this patent is extended or adjusted under 35 U.S.C. 154(b) by 110 days.

(21) Appl. No.: 12/481,828

(22) Filed: Jun. 10, 2009

(65) Prior Publication Data
US 2009/0311362 A1 Dec. 17, 2009

(30) Foreign Application Priority Data

Jun. 13, 2008 (DE) .......................... 10 2008 028 076

(51) Int. Cl.
*B29C 33/30* (2006.01)

(52) U.S. Cl. .................. 249/114.1; 249/115; 249/135; 249/139; 425/470

(58) Field of Classification Search .................. 425/403, 425/470; 249/114.1, 115, 117, 134, 139, 249/205; 264/219, 220
See application file for complete search history.

(56) References Cited

U.S. PATENT DOCUMENTS

| | | | | |
|---|---|---|---|---|
| 2,139,191 A * | 12/1938 | Jung | ............................ | 249/53 R |
| 4,086,378 A * | 4/1978 | Kam et al. | ..................... | 264/258 |
| 6,007,894 A * | 12/1999 | Barnes et al. | ................. | 264/257 |
| 6,378,836 B1 * | 4/2002 | Anthony | ........................ | 425/470 |
| 6,681,543 B2 * | 1/2004 | Nada et al. | ..................... | 264/249 |
| 6,843,953 B2 | 1/2005 | Filsinger et al. | | |
| 6,958,105 B2 * | 10/2005 | Herrmann et al. | ............ | 264/571 |
| 7,479,201 B1 * | 1/2009 | Wegner et al. | ................ | 264/257 |

FOREIGN PATENT DOCUMENTS

DE 100 13 409 11/2000
* cited by examiner

*Primary Examiner* — Richard Crispino
*Assistant Examiner* — Thukhanh Nguyen
(74) *Attorney, Agent, or Firm* — Michael J. Striker

(57) ABSTRACT

A tool, has a tool shell having a top side for shaping a fiber-reinforced component, and an underside, wherein said tool shell is dimensionally stable and is provided with an integrally moulded ribbed structure on said underside to provide a dimensional stability.

17 Claims, 3 Drawing Sheets

TOOL AND METHOD FOR MANUFACTURING A TOOL, IN PARTICULAR FOR MANUFACTURING FIBER-REINFORCED COMPONENTS

CROSS-REFERENCE TO RELATED APPLICATION

The invention described and claimed hereinbelow is also described in DE 10 2008 028 076.3 filed on Jun. 13, 2008. This German Patent Application, whose subject matter is incorporated here by reference, provides the basis for a claim of priority of invention under 35 U.S.C. 119(a)-(d).

BACKGROUND OF THE INVENTION

The present invention relates to a tool which is suitable in particular for use to manufacture fiber-reinforced components, and to a method for manufacturing a tool of this type. A tool according to the present invention is used in particular to manufacture carbon (CFK) components or the like, in the case of which layers or mats composed of reinforcing fibers are placed on the tool, then the mats or layers which include the reinforcing fibers are saturated with a resin which then hardens under the influence of heat.

DE 100 13 409 C1 made known a method for manufacturing fiber-reinforced plastic components, in the case of which a fiber-reinforced semi-finished product is situated on a surface of a tool, and in which the tool is sealed using a film. The air is evacuated from the space between the film and the surface of the tool, and a matrix material (resin) is injected into the intermediate space. Via the vacuum that is applied, the matrix material (resin) in the intermediate space is distributed between the surface of the tool and the film. Once the tool has been brought to the desired reaction temperature in an oven, the resin hardens, and the shape that is prescribed by the tool forms in the fiber-reinforced component. After hardening is complete, the component may be removed. The known method is also suitable for use to manufacture fiber-reinforced components having a large surface area.

It is difficult, however, to manufacture a tool having an exact fit, which guarantees the desired deviations in shape of a finished, three-dimensional component.

To manufacture fiber-reinforced components using methods of this type, tools are often used in the prior art, in the case of which the tool shell, for shaping purposes, is composed of a fiber-reinforced plastic which is manufactured using an original mould. The dimensional stability is created by using a base having a large number of tubular steel profiled elements. A tool of this type which is used to manufacture fiber-reinforced components is cost-effective when used to manufacture small quantities. However, it is disadvantageous that the dimensional stability of the mould shell is limited by different expansions of the mould shell which is composed of a fiber-reinforced plastic, and of the base which is composed of steel. As a result, only a small number of fiber-reinforced components may be manufactured using a mould before it must be replaced.

Furthermore, the related art makes known a tool, in the case of which individual plates are welded onto a base frame composed of steel until the desired shape is attained using a large number of welded-on plates. A tool of this type may be composed, e.g. of FeNi 36 steel (Invar), which is a special steel having a low coefficient of thermal expansion but which is difficult to machine, thereby resulting in high costs for semi-finished products and tools. Using a tool of this type, a high yield may be attained using one tool, although the low thermal conductivity and the high heat capacity make the shaping process difficult and reduce the yield.

SUMMARY OF THE INVENTION

Based on the related art described above, the object of the present invention, therefore, is to provide a tool for use in particular to manufacture fiber-reinforced components, and a method for manufacturing a tool of this type, using which a high rate of manufacture is attainable while simultaneously resulting in high accuracy and, in particular, cost-effective production even when large quantities are involved.

The tool according to the present invention is used in particular to manufacture fiber-reinforced components, and it includes at least one tool shell having a top side for shaping the fiber-reinforced component, and having an underside. The tool shell is essentially dimensionally stable in design; to this end, the tool shell includes an integrally moulded ribbed structure on the underside.

The tool according to the present invention has several advantages. One considerable advantage of the tool according to the present invention is that it has high dimensional stability, thereby making it possible to manufacture reproducible and high-quality, fiber-reinforced components. Due to the dimensional stability of the tool shell, it is possible to produce a large number of fiber-reinforced components using one tool without diminishing the quality of the components.

Using the tool shell according to the present invention, it is possible to significantly improve the manufacturing accuracy. Via the design of the integrally moulded ribbed structure in particular, it is possible to influence the expansion behavior of the tool under the effect of heat in a targeted manner. Since the hardening of the fiber-reinforced component regularly takes place at elevated temperatures which may reach, e.g. 180°, the thermal expansion of the tool according to the related art results in an inexact production quality of the fiber-reinforced component. In contrast, according to the present invention, a high homogeneity of thermal expansion is attained using the integrally moulded ribbed structure. Furthermore, the local thermal expansion is precalculated and predetermined, thereby resulting in a correction of the thermal expansion, thereby making it possible to compensate for the thermal expansion in advance.

Since the tool may be used to manufacture a large number of fiber-reinforced components, the tool costs per manufactured component is low.

In a preferred development of the present invention, the ribbed structure includes a plurality of reinforcing ribs which have the same coefficients of thermal expansion as does the tool shell, and which are composed in particular of essentially the same material. In particular, the tool is composed of a steel, and, in particular, of a gas-tight or essentially gas-tight steel.

A tool having a plurality of reinforcing ribs on the underside, in which case the reinforcing ribs and the tool shell are composed of the same material, is very advantageous since the expansion at higher temperatures results in a defined condition which may be influenced essentially via the three-dimensional structure of the reinforcing ribs. The expansion may be influenced in a targeted manner by making a suitable selection of the courses and cross-sections of the reinforcing ribs.

In particular, the ribbed structure is designed as a single piece with the tool shell, thereby resulting in a homogeneous tool shell, the thermal expansion behavior of which is predictable and calculable.

The tool shell is preferably composed of a cast material which has been machined on both sides. Particularly preferably, the tool shell is composed of a cast steel. A cast steel that is air-tight and, in particular, gas-tight makes it possible to design the contour of the tool shell in a flexible manner, thereby making it possible to adapt the shaping of the top side of the tool to a large degree to the desired shape of the fiber-reinforced component.

The use of ST 52, for example, which has a considerably higher thermal conductivity than Invar steel, e.g. three to four times higher, is preferred. As a result, the heating-up and cooling-down process for hardening the CFK component is greatly accelerated, thereby increasing the rate of production. It is also possible to use another vacuum-tight cast steel.

In preferred embodiments, a wall thickness of the tool shell and a wall thickness of the reinforcing ribs are essentially constant across the entire tool shell. This makes it possible to attain a particularly homogeneous heating-up and cooling-down of the tool, thereby ensuring that the conditions across the tool shell are as even as possible. This results in a uniform quality of the fiber-reinforced components across the entire surface. Furthermore, a design of this type makes it easier to calculate the shape of the tool with consideration for the temperature expansion at the desired hardening temperature. Furthermore, it is made possible to compensate for the temperature expansion of the tool, which makes it possible to design the fiber-reinforced components in an even more precise manner.

Using the casting method and subsequently machining the tool shell on both sides, it is possible to design the wall thickness of the tool shell to be less than 30 mm, and, in particular, to lie in a range between approximately 5 mm and 20 mm, e.g. at 10 mm. A height of the reinforcing ribs perpendicular to the surface of the tool shell is preferably between 5 mm and 100 mm, while a thickness of the reinforcing ribs parallel to the surface of the tool shell is designed, in particular, to be equal to the wall thickness of the tool shell, and, in particular, is less than 30 mm, is preferably between approximately 5 mm and 20 mm, and may be, e.g. 10 mm.

In all designs of the tool, a structure of the reinforcing ribs may be designed to be rectangular or rounded in shape, to have three or more corners, or to have a honeycombed design. In particular, the structure of the reinforcing ribs is designed accordingly across the surface of the tool. A cross-section of individual reinforcing ribs is preferably rectangular in design, in order to ensure that the wall thickness of the tool shell and the integrally moulded reinforcing ribs remains constant.

According to a particularly advantageous development, the tool shell is composed of at least two separate segments which are connected to one another in an air-tight and vacuum-tight manner in particular. The vacuum tightness is important since, when a method is used in which the liquid resin is suctioned using an underpressure into the intermediate space between the surface of the tool and a film applied thereon, it is possible to ensure that the tool shell will function reliably overall.

To ensure that the required vacuum tightness exists, the segments of the tool shell are welded to one another on the top side. This takes place using a laser welding method in particular, in the case of which the material of which the segments are composed at the connecting weld seam is only melted locally, thereby largely preventing the tool from becoming warped due to the effect of temperature.

A connection is preferably established on the underside of the segments in addition to a possible welding procedure on the top side. The segments are connected to one another in a form-fit manner on the underside. It is possible, e.g. to initially fix two segments in position relative to one another using location pins, thereby enabling the two segments to be screwed together subsequently on the underside. Via the location pins it is ensured that the segments are oriented in fixed positions relative to one another.

In a preferred development of the tool according to the present invention, one or more expected expansion points may be specified on the top side of the tool shell; to this end, the ribbed structure is designed accordingly on the underside. For example, stiffness may be reduced locally by reducing the thickness and/or increasing the height of a certain rib, thereby resulting in greater expansion in the corresponding region. Using, e.g. higher and lower reinforcing ribs of this type, it is possible to adjust the temperature expansion of the tool to the desired properties.

A receiving groove is preferably provided in an edge region on the top side for receiving a process film. A process film of this type may include air intake adapters or an air outlet adapter, and one adapter for the entry of liquid resin in order to suction out air from the intermediate layer between the process film and the top side of the tool shell, and to suction in and distribute the liquid resin evenly via the underpressure.

A duroplastic material which is reinforced with carbon fibers, glass fibers, aramid fibers, bore fibers or similar reinforcing fibers is preferably used. In isolated cases, it is also possible to use prepregs, in the case of which the fiber mats that are used are saturated with the resin. However, it is also possible to use thermoplastic materials which may usually be processed at lower temperatures.

Using the method according to the present invention, a tool is created which is suitable in particular for use to manufacture fiber-reinforced components. A tool shell is manufactured using a casting method, in the case of which the top side which is provided to shape the fiber-reinforced component, and the opposite underside are machined after the casting process is carried out in order to form a ribbed structure which includes a plurality of reinforcing ribs on the underside in order to form a dimensionally stable tool shell.

The method according to the present invention also has several advantages. One considerable advantage is the fact that the tool is manufactured using a casting method, followed by machining of the shaping top surface and the underside of the tool shell. Via the casting method, it is possible to manufacture a tool shell that meets the desired requirements after the top side and underside are machined.

In the case of the casting method, however, the special properties of the material used may be taken into account, thereby preventing the formation of shrinkage cavities during casting. By machining the underside having the ribbed structure, the desired dimensional stability of the tool shell is attained, while machining the top side ensures that the top side is adapted to the desired shape of the fiber-reinforced components to be manufactured.

In preferred developments, the tool shell is formed by at least two separate segments which are welded to one another on the top side and are connected to one another in a form-fit manner on the underside.

Further advantages and features of the present invention result from the description that follows of an exemplary embodiment which is explained below with reference to the attached figures.

DESCRIPTION OF THE PREFERRED EMBODIMENTS

Figure 1:
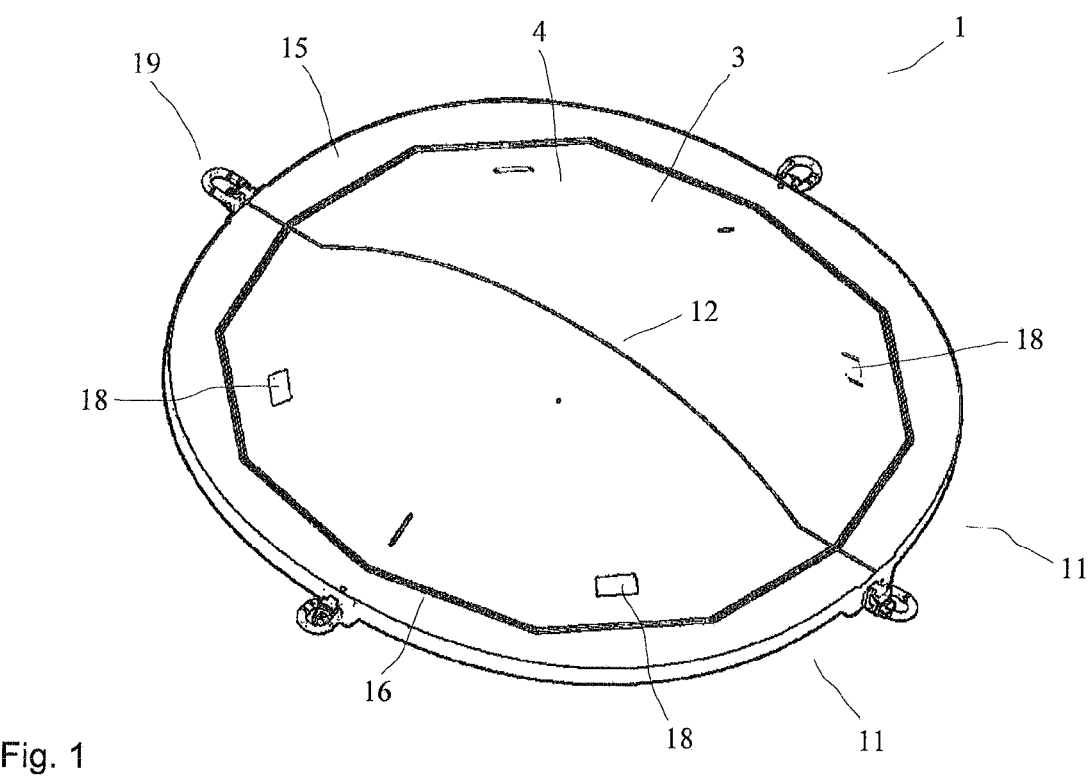
FIG. 1 shows a perspective top view of a tool according to the present invention.

An embodiment of the present invention will be explained in greater detail below with reference to FIGS. 1 through 6. Tool 1 according to the present invention, which is shown in a perspective top view in FIG. 1, is composed of two segments 11 which are connected to one another, are positioned relative to one another with an exact fit, and which were connected to one another on the top side via a weld seam 12. Weld seam 12 was created using a laser welding method which results in a relatively minimal local development of heat, thereby largely preventing deviations in shape from occurring.

Tool 1 includes a tool shell 3 which, in this case, includes a bulged structure for manufacturing the desired fiber-reinforced components 2, and it includes an edge region 15 having a receiving groove 16 to which process film 17 may be attached in an air-tight manner.

Loops 19 are used to carry tool 1 to the intended site, or to fasten tool 1 at the intended site.

To manufacture a fiber-reinforced component 2 (see FIG. 6), top side 4 of tool shell 3 of tool 1 is covered with a fiber fabric or fiber mats or the like until the desired thickness of the fiber-reinforced plates is attained. Next, process film 17 (see FIG. 5) is applied, and it is attached to receiving groove 16 in an air-tight manner. Air is then suctioned out of the intermediate space between film 17 and top side 4 of tool shell 3, and a relative vacuum is created which suctions in liquid resin that is injected via a resin inlet 24, and which supports the distribution of the liquid resin on top side 4 of tool shell 3.

The applied vacuum may be monitored using a pressure display 28, and it ensures that the liquid resin is distributed evenly and that the fiber mats, fiber plates, or layers of fiber fabric are wetted evenly.

After tool 1 is heated and held at a constant temperature for a predetermined process time, tool 1 may be removed from the oven and cooled. After a sufficient hardening time, component 2 may be removed and its quality may be inspected before it is delivered for its intended use.

To inspect the quality, sample regions 18 (see FIG. 1) may be provided which are taken from finished, fiber-reinforced component 2 in order to inspect the quality of the manufactured component at that point, and/or to forward it for storage so that the samples may be investigated later.

Figure 2:
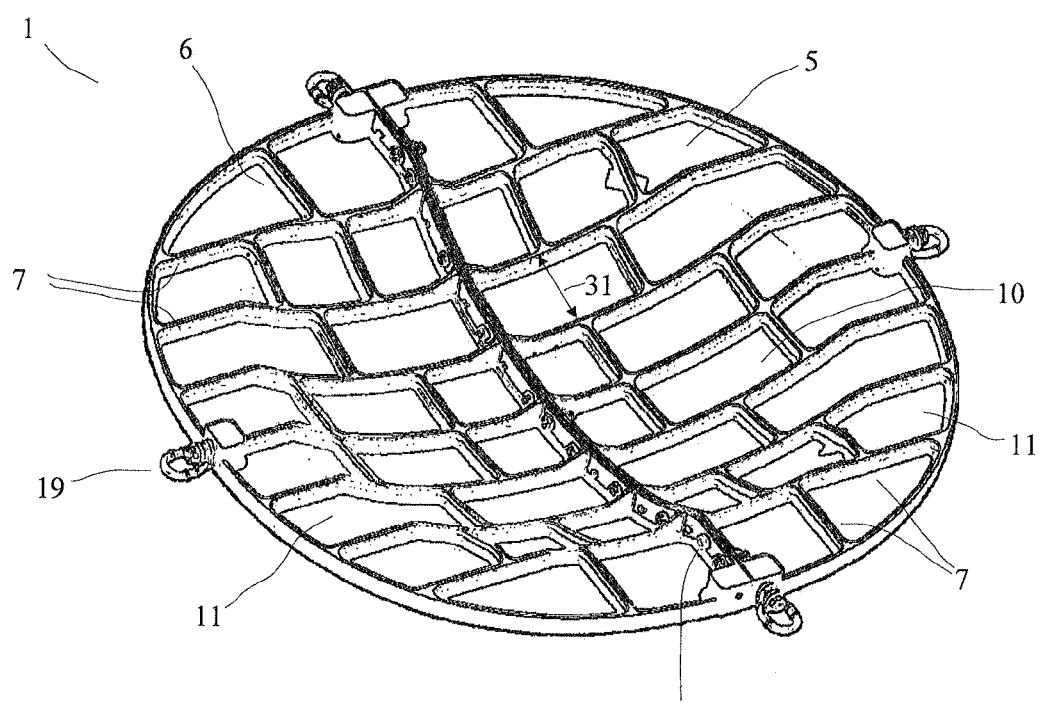
FIG. 2 shows a perspective underside view of the tool in FIG. 1.

A perspective underside view of the tool according to the present invention is shown in FIG. 2. As shown clearly, tool 1 has a ribbed structure 6 on underside 5, which includes, in this case, a large number of reinforcing ribs 7 which are situated approximately perpendicular to one another, and which extend downward away from underside 5 of tool 1 in an approximately perpendicular manner.

In this embodiment, structure 10 of reinforcing ribs 7 is rectangular. In another design, ribbed structure 7 may also include a surface structure that is not rectangular. For example, it is possible to design ribbed structure 6 to be honeycombed, or to include three, four, five, or six corners, so that the courses of individual reinforcing ribs 7 intersect one another not only at right angles, as shown in FIG. 2, but at any angle.

Reinforcing ribs 7 are integrally moulded on tool 1 and are designed as a single piece therewith, thereby resulting in a homogeneous material. This is attained by initially casting individual segments 11 of the tool in a casting process and then machining them in a material-removing manner on top side 4 and on underside 5 in order to create the desired surface structure.

Figure 3:
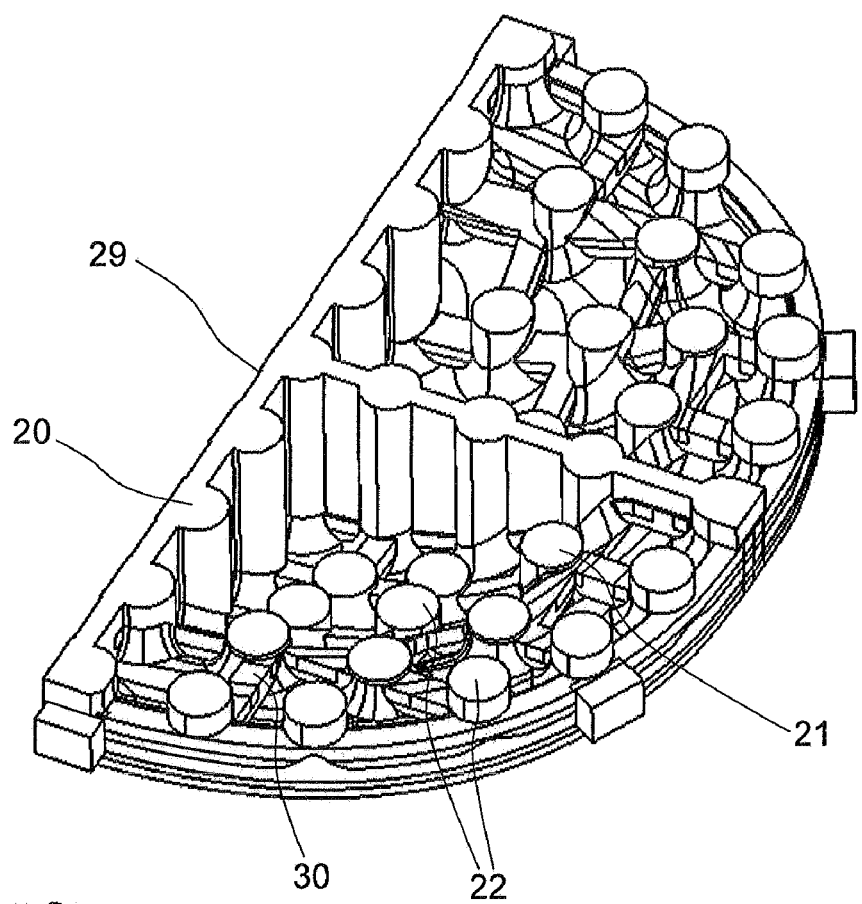
FIG. 3 shows a perspective view of a segment of the tool in FIG. 1 after the casting process.
Figure 4:
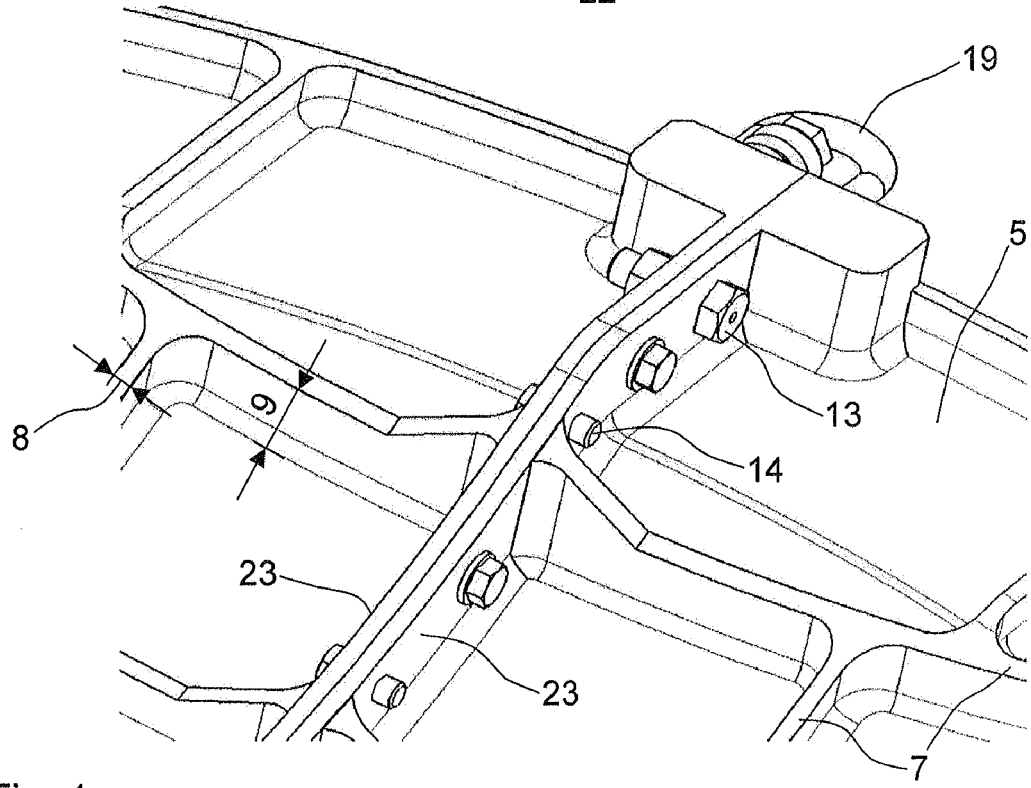
FIG. 4 shows a detailed view of the tool in FIG. 1.
Figure 5:
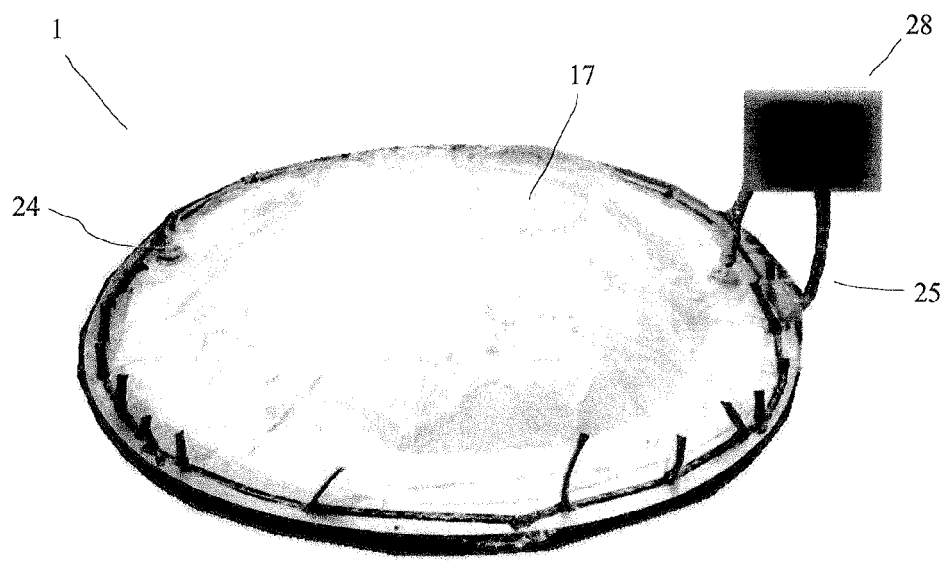
FIG. 5 shows the tool in FIG. 1 during the manufacture of a fiber-reinforced component.

FIG. 3 shows a perspective underside view of a raw segment 29 which is used to manufacture a segment 11 of tool 1 using a material-removing machine method. In this case, raw structure 21 on underside 5 includes cylindrical projections 22 and connecting segments 30 which are used in the subsequent processing step to form individual reinforcing ribs 7. To prevent the formation of air inclusions or other flaws in the cast part, the shape of the cast part is calculated exactly in advance, and a structure is cast that contains all reinforcing ribs 7 while simultaneously and largely preventing the formation of flaws.

Segments 11 that have the desired surface structures on top side 4 and desired ribbed structure 6 on underside 5 are produced via the material-removing processing of underside 5 or top side 4 of raw segments 29. At the same time, in particular, a wall thickness 8 of reinforcing ribs 7 and tool shell 3 is held largely constant across the entire surface of segment 11. In a special design case, the wall thickness is approximately 10 millimeters, while a diameter of a segment may be one, two, three, or even four meters, thereby making it possible to manufacture segments 11 having a large surface area, a small wall thickness 8, but high dimensional stability. By connecting a plurality of segments 11, it is possible to manufacture a much larger tool.

To connect a plurality of segments 11 to form a tool 1, the segments are connected to one another at the connecting line via a weld seam 12 which is created using a laser welding method.

Fastening edges 23 along the contact line and both segments 11 are provided on underside 5 of tool 1, which are used to fixedly connect the two segments 11. The two segments 11 are held in position relative to one another using location pins 14, while a form-fit connection is attained using screws 13. In contrast, weld seam 12 on top side 4 is used essentially to join the two segments 11, and to ensure that vacuum tightness exists when fiber-reinforced components 12 are manufactured. Otherwise, air could be suctioned in during evacuation, through a gap between segments 11, which could result in inadequate quality of fiber-reinforced components 2 that were manufactured.

To influence a local expansion of tool shell 3 in a targeted manner, height 9 of reinforcing ribs 7 and their distance 31 to the next reinforcing rib may be adjusted accordingly and in a localized manner. Thermal expansion is reduced locally by using a greater height 9, while a lower height 9 or a greater distance 31 increases the local ductility.

By using a suitable ribbed structure 6 having appropriate wall thicknesses 8 and heights 9 of ribs 7, it is possible to adjust the desired ductility across the entire surface of tool shell 3. Furthermore, by calculating the thermal expansion in advance using a finite element model (FEM), it is possible to exactly calculate the CAD model and its thermal expansion in advance, thereby making it possible to account for the thermal expansions resulting from tool 1 in advance, so that tool shell 3 has a desired surface contour at a defined process temperature.

Figure 6:
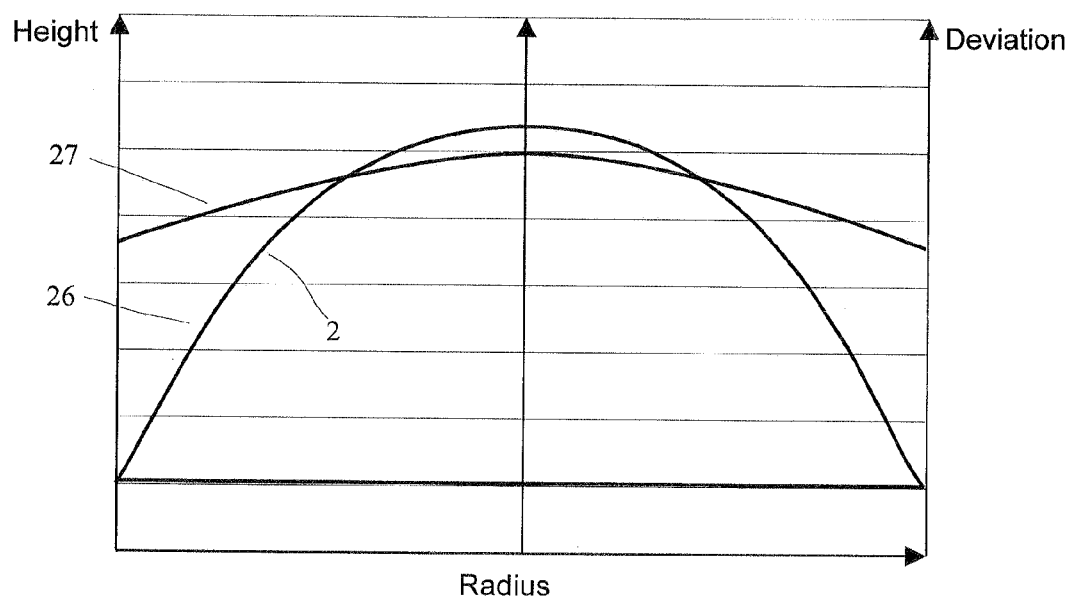
FIG. 6 shows the structure and deviations of a component that was manufactured.

The contour of a fiber-reinforced component 2 across the radius is shown in FIG. 6. Graph 26 of the height plotted against the radius approximately corresponds to the ideal requirements in this case. Curve 27 shows the local deviation. In a specific embodiment here, given a radius of approximately one meter, the maximum deviation from the ideal line is less than 0.4 millimeters, thereby making it possible to manufacture highly exact fiber-reinforced components 2.

It will be understood that each of the elements described above, or two or more together, may also find a useful application in other types of constructions differing from the types described above.

While the invention has been illustrated and described as embodied in a tool and method for manufacturing a tool, in particular for manufacturing fiber-reinforced components, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is Set forth in the appended claims.

The invention claimed is:

1. A tool, comprising
a tool shell formed of a plurality of separate segments and having a top side for shaping a fiber-reinforced component, an underside comprising an integrally molded ribbed structure including a plurality of reinforcing ribs and means for connecting said separate segments to one another,
wherein said means for connecting includes screws extending through fastening edges of said segments on said underside and provides a form-fit connection and a weld seam joining the segments on said top side, in a vacuum-tight manner,
wherein said tool shell is dimensionally stable and is provided with an integrally molded ribbed structure on said underside to provide a dimensional stability,
wherein said reinforcing ribs are selected from the group consisting of ribs which have same coefficients of thermal expansion as does said tool shell, ribs which are composed of essentially a same material as said tool shell and both, and
wherein said tool shell and said ribbed structure together form an element composed of a one-piece same material.

2. The tool as defined in claim 1, wherein said tool shell is formed as a cast tool shell machined on both sides.

3. The tool as defined in claim 2, wherein said tool shell is composed of a cast steel.

4. The tool as defined in claim 1, wherein said tool shell and said reinforcing ribs have a wall thickness which is essentially constant across said tool shell in its entirety.

5. The tool as defined in claim 1, wherein said tool shell has a wall thickness which is less than 30 mm.

6. The tool as defined in claim 5, wherein said wall thickness of said tool shell is between substantially 5 mm and 20 mm.

7. The tool as defined in claim 5, wherein said reinforcing ribs have a height which is between 8 mm and 100 mm.

8. The tool as defined in claim 1, wherein said reinforcing ribs have a structure selected from the group consisting of a structure having a rectangular shape, a structure having a rounded shape, a structure having three corners, a structure having more than three corners, and a structure having a honeycomb design.

9. The tool as defined in claim 1, wherein said tool shell is composed of at least one segment.

10. The tool as defined in claim 1, wherein said top side has an edge region provided with a receiving groove which is configured to receive a channel selected from the group consisting of a resin channel, a vacuum channel, and both.

11. A method for manufacturing a tool, comprising the steps of
manufacturing a tool shell having a top side for shaping a fiber-reinforced component and having an underside;
forming an integrally molded ribbed structure on the underside of the tool shell to make the tool shell dimensionally stable and so that the tool shell and the ribbed structure together form an element composed of a one-piece same material;
making said tool shell with said integrally molded ribbed structure of a plurality of separate segments; and
connecting said separate segments of said tool shell with said integrally molded ribbed structure, to one another in an air-tight manner, by extending screws through fastening edges of said segments and thereby providing a form-fit connection and making a weld seam between said segments on said top side and thereby providing a vacuum-tight connection.

12. The method as defined in claim 11, wherein said forming the ribbed structure includes machining the top side and the underside of the tool shell after the casting process.

13. A tool, comprising
a tool shell having a top side for shaping a fiber-reinforced component, an underside comprising an integrally molded ribbed structure, a plurality of separate segments that are connected to one another and means for connecting said separate segments with one another including screws extending through fastening edges of said segments on said underside and providing a form-fit connection and a weld seam joining said segments on said top side and providing a vacuum-tight connection therebetween,
wherein said tool shell is dimensionally stable,
wherein said ribbed structure includes a plurality of reinforcing ribs formed as ribs selected from the group consisting of ribs which have same coefficients of thermal expansion as does said tool shell, ribs which are composed of essentially a same material as said tool shell and both, said integrally molded ribbed structure providing said dimensional stability, and
wherein said tool shell and said ribbed structure together form an element composed of a one-piece same material.

14. The tool as defined in claim 13, wherein said separate segments are connected to one another in a vacuum-tight manner.

15. The tool as defined in claim 13, wherein said segments are welded to one another on said top side.

16. The tool as defined in claim 13, wherein said segments are connected to one another in a form-fit manner on said underside.

17. A method for a manufacturing tool, comprising the steps of
manufacturing a tool shell, having a top side for shaping a fiber-reinforced component and having an underside;

forming an integrally molded ribbed structure on the underside of the tool shell to make the tool shell dimensionally stable;

configuring the ribbed structure as a single piece with the tool shell, so that the tool shell and the ribbed structure together form an element composed of a one-piece same material;

making said tool shell with said integrally molded ribbed structure of a plurality of separate segments; and connecting said separate segments of said shell with said integrally molded ribbed structure, to one another in an air-tight manner, by extending screws through fastening edges of said segments and thereby providing a form-fit connection and making a weld seam between said segments on said to side and thereby providing a vacuum-tight connection.

* * * * *